Sept. 28, 1948.  A. M. SASGEN  2,450,303
CLAMPING DEVICE OF THE VISE TYPE
Filed July 17, 1944
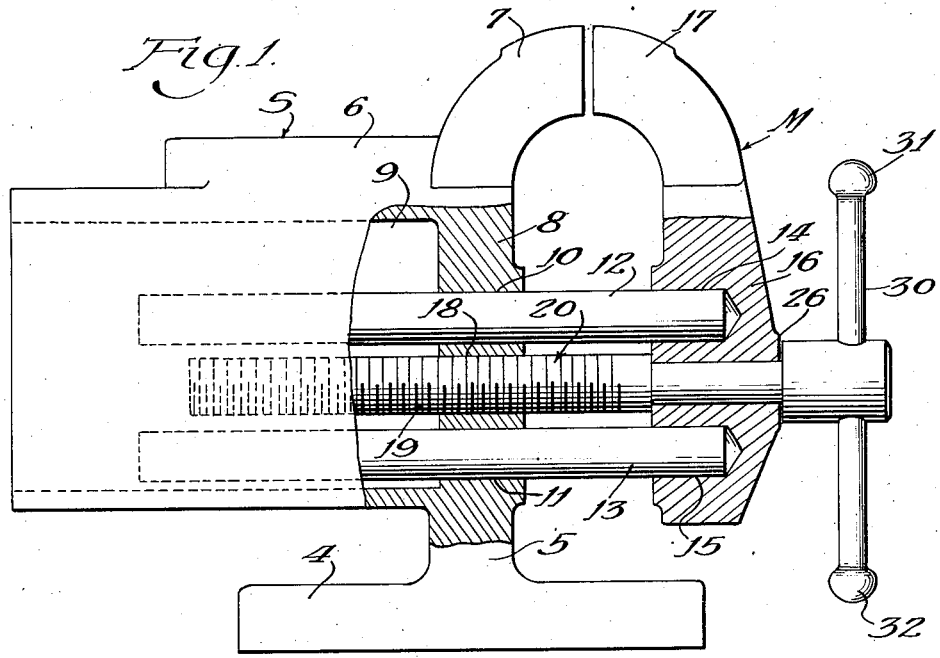
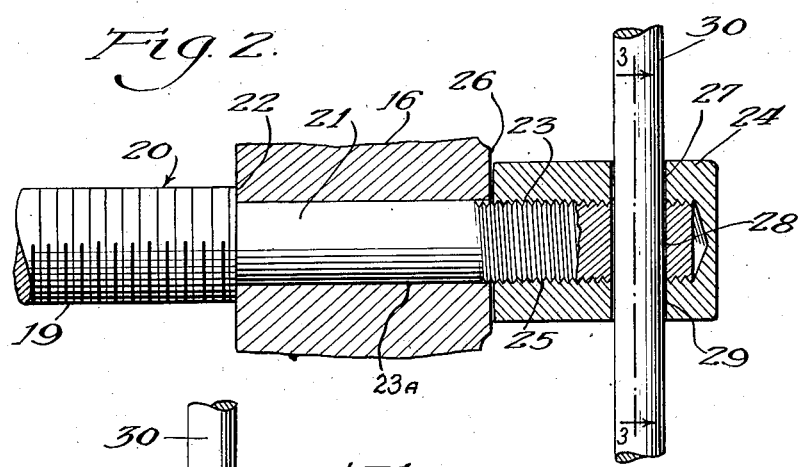
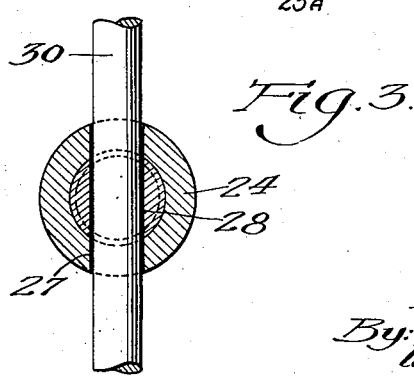
Inventor:
Anthony M. Sasgen
By: Wallace and Cannon
Attorneys.

Patented Sept. 28, 1948

2,450,303

UNITED STATES PATENT OFFICE 2,450,303

CLAMPING DEVICE OF THE VISE TYPE

Anthony M. Sasgen, Chicago, Ill., assignor to Grand Specialties Company, Chicago, Ill., a corporation of Illinois Application July 17, 1944, Serial No. 545,334

2 Claims. (Cl. 81—33)

This invention relates to clamping devices of the character including relatively movable elements between which work may be clamped, vises and the like being examples of such clamping devices.

Clamping devices of the aforesaid character usually include movable and stationary elements and a screw member which is threaded into a tapped opening in the stationary element and to which the movable element is connected so that when the screw member is rotated in the tapped opening, the movable element is moved relative to the stationary element. Likewise one or more guides are sometimes fastened in the movable element and are freely passed through suitable guide openings in the stationary element so as to thereby insure that clamping jaws provided on the two elements are maintained in predetermined relation one with the other. Heretofore resort has been had to a variety of arrangements for connecting the movable element of a clamping device of the aforesaid character to the screw member thereof but usually such devices have been relatively complicated and expensive to manufacture and install.

It is therefore a primary object of my invention to connect the movable element of a clamping device of the aforesaid character to the screw member or other operative portion thereof in a novel and inexpensive manner and objects ancillary to the foregoing are to afford a shoulder on the operative member against which a portion of a movable element, such as referred to hereinabove, may be abutted and to maintain the movable element in engagement with such a shoulder by mounting a retaining member on the operative member in engagement with the movable element; to extend a portion of the operative member into the retaining member and to then secure these members together against separating movement; to thread the retaining member onto the operative member; to thereby assist in dissipating stresses impressed thereon; to extend a handle element through aligned openings in the retaining and operative members to thereby secure the same together, and to prevent displacement of the handle element from the aforesaid aligned openings in a novel and effective manner.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a vise embodying my invention and in which certain parts are broken away;

Fig. 2 is a longitudinal sectional view drawn to an enlarged scale of the portion of the vise illustrated at the right-hand end of Fig. 1; and Fig. 3 is a sectional detail view taken substantially on the line 3—3 on Fig. 2.

The vise illustrated in the accompanying drawings includes a base 4 having a medially located upwardly extending standard 5 that supports the stationary element S of the illustrated vise and desirably the body portion 6 of the stationary element S, the standard 5 and the base 4 are cast as a unitary part. A clamping jaw 7 is provided on a vertically extending wall 8 of the body portion 6 and a clearance space or recess 9 is formed in the body 6 rearwardly of the wall 8 to afford clearance for operative parts of the vise as will hereinafter appear.

Spaced apart parallel openings 10 and 11 are provided in the wall 8 and guide rods 12 and 13 are respectively slidably extended through these openings and into the clearance recess 9. The forward ends of the guide rods 13 and 14 are respectively anchored in blind recesses 14 and 15 extended inwardly from the inner wall of the body 16 of the movable element M of the vise whereby the movable element is supported for movement toward and away from the stationary element S, the movable element including a jaw 17 that is adapted to cooperate with the jaw 7 to retain work in the vise.

In the present instance a tapped opening 18 is formed in the wall 8 between and in parallel relation with the openings 10 and 11 and the screw threaded portion 19 of the screw element, generally indicated by 20, is threaded into this tapped opening. The screw element 20 also includes a forwardly projecting stem portion 21 of smaller diameter than the screw threaded portion 19 thereof whereby a shoulder 22 is defined at the junction of the portions 19 and 21. Hence the stem portion 21 may be passed through a bore 23A in the body 16 so that the bore 23A affords a relatively snug rotatable bearing for the stem 21, and the inner wall of the body 16 of the movable element is thus abutted against the shoulder 22 as illustrated in Fig. 2.

The forward end of the stem portion 21 is screw threaded as indicated at 23. A tubular retaining member 24 has a tapped opening 25 extended thereinto from one end thereof and desirably this tapped opening terminates inwardly of the opposite end of the retaining member 24. In order to retain the inner wall of the body 16 in clamped relation with the shoulder 22, the screw threaded portion 23 of the screw member 20 is threaded into the tapped opening 25 to bring the inner end of the retaining member 24 into clamping relation with the outer wall of the body 16. Desirably a machined surface 26 is afforded on the outer wall of the body 16 to have the inner end of the retaining member 24 engaged therewith.

When the inner end of the retaining member 24 is arranged in clamping relation with the surface 26 a drill or the like is passed through the retaining member 24 and the screw threaded end 23 of the screw member 20 which thereby affords the aligned openings 27, 28 and 29. The handle member 30 is then passed through these aligned openings and such extension of the handle member through these openings is effective to prevent relative movement between the retaining member 24 and the screw member 20, wherefore the body 16 is maintained in engagement with the shoulder 22. Hence the shoulder 22 is effective to prevent movement of the body member 16 in one direction along the screw member 20 and the retaining member 24 is effective to prevent the movement of this body member in the other direction along screw member 20, wherefore the movable element of the clamping device is connected to the operating member, as the screw member 20, for movement therewith, but is held against displacement therefrom. The screw threaded interconnection between the screw member 20 and the retaining member 24 is effective to dissipate the stress impressed upon the retaining members when work is clamped between the jaws 7 and 17 so that such stress is not impressed upon the handle member 30.

While the handle member 30 may be prevented from passing from the aligned openings 27, 28 and 29 in a variety of ways, I prefer to form unitary therewith enlarged portions as 31 and 32 at opposite ends thereof. When unitary portions as 31 and 32 are to be provided on a handle element as 30 so as to prevent displacement thereof from aligned openings as 27, 28 and 29, I have found it advantageous to form such portions immediately after the handle element has been passed through the aligned openings as aforesaid. To this end suitable forming means are provided adjacent the drilling machine in which the aligned openings are drilled so that when the opposite ends of the handle element as 30 are disposed in the forming means and these are forced toward each other, the unitary form portions as 31 and 32 will be provided on the handle element as 30.

Hereinabove I have described a particular vise illustrated in the accompanying drawings and I have explained the manner in which the movable element of this vise is connected to the operating member of the vise. It will be understood, however, that the novel manner in which the movable element of the hereinabove described vise is connected to the operating member of this vise may be utilized in vises or other clamping devices other than that herein described and so to do is within the ambit of my invention.

It will be manifest in the foregoing description that a clamping device arranged in the manner hereinabove described enables the hereinabove set forth and kindred objects of this invention to be realized. However, while I have illustrated and described a preferred embodiment of my invention, it is to be understood that this is capable of variation and modification and I therefore do not wish to be limited to the precise details set forth, but desire to avail myself of such changes and alterations that fall within the purview of the following claims.

I claim:

1. In a clamping device including a stationary clamping element, a movable clamping element, an operating member for moving the movable element relative to the stationary element and having a forwardly projecting stem portion of relatively smaller diameter at one end thereof to afford an integral shoulder facing forwardly at the junction of said stem and said movable element, said operating element being passed through an opening in the movable element to have one face of such element engaged with said shoulder, a retaining member screw threaded onto said operating member stem and engaged with the opposite face of said movable element, and means extending through said retaining member and said stem for securing said retaining member to said operating member, said last named means providing a handle operable to turn said retaining member and said operating member.

2. In a clamping device including a stationary clamping element and a movable clamping element, an operating member for moving said movable element relative to said stationary element, said operating member having screw threads formed on one end thereof and operable to engage complementary portions of said stationary element, said operating member having a reduced stem formed at the other end thereof to thereby provide an abutment between said ends, said stem extending through an opening in said movable element, a retaining member screw threaded onto said stem and engaging one face of said movable element, said retaining member being operable to hold said abutment against the face of said movable element opposite to said last named face, and a rod extending through aligned openings in said retaining member and said stem for preventing relative movement therebetween, both ends of said rod projecting from said retaining member and said rod comprising a handle operable to turn said retaining member and said stem.

ANTHONY M. SASGEN.

REFERENCES CITED

The following references are of record in the file of this patent:

UNITED STATES PATENTS

| Number | Name | Date |
|---|---|---|
| 221,781 | Cheney | Nov. 18, 1879 |
| 690,311 | McDonnell | Dec. 31, 1901 |
| 1,314,985 | Seymour | Sept. 2, 1919 |
| 1,392,434 | Miller | Oct. 4, 1921 |
| 1,720,464 | Brink | July 9, 1929 |
| 2,236,135 | Good | Mar. 25, 1941 |

FOREIGN PATENTS

| Number | Country | Date |
|---|---|---|
| 5,196 | Great Britain | Dec. 11, 1880 |